(12) United States Patent
Berger et al.

(10) Patent No.: US 7,325,885 B2
(45) Date of Patent: Feb. 5, 2008

(54) REGULATOR VALVE FOR A TORQUE-TRANSMITTING MECHANISM AND METHOD OF ENGAGING A TORQUE-TRANSMITTING MECHANISM

(75) Inventors: Todd R. Berger, Saline, MI (US); Steven P. Moorman, Dexter, MI (US); Brian W. Whitmarsh, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 282 days.

(21) Appl. No.: 11/131,541

(22) Filed: May 18, 2005

(65) Prior Publication Data
US 2006/0006736 A1      Jan. 12, 2006

Related U.S. Application Data

(60) Provisional application No. 60/586,651, filed on Jul. 9, 2004.

(51) Int. Cl.
*B60T 8/38* (2006.01)

(52) U.S. Cl. .............................. 303/117.1; 192/109 F; 137/625.64; 475/127

(58) Field of Classification Search ............. 303/117.1, 303/113.1; 192/109 F; 60/547.1, 574; 137/625.6, 137/625.64; 91/433, 469; 477/158, 166; 475/120, 127, 128, 129
See application file for complete search history.

(56) References Cited

U.S. PATENT DOCUMENTS

| 3,847,179 | A  | * | 11/1974 | Shellman ................... 137/596 |
| 5,924,539 | A  |   | 7/1999  | Braun et al. ................. 192/109 |
| 6,155,949 | A  |   | 12/2000 | Long et al. ................... 475/127 |
| 6,378,557 | B2 |   | 4/2002  | Kawamura et al. .... 137/625.64 |
| 6,591,958 | B1 | * | 7/2003  | Moorman ................... 192/85 R |
| 6,595,340 | B2 | * | 7/2003  | Moorman et al. ....... 192/85 AA |
| 6,796,330 | B1 | * | 9/2004  | Moorman ............... 137/625.66 |
| 6,994,648 | B2 | * | 2/2006  | Miyata et al. .............. 475/128 |

* cited by examiner

*Primary Examiner*—Pam Rodriguez

(57) ABSTRACT

A regulator valve for controlling the pressure of fluid engaging a torque-transmitting mechanism in a transmission includes a valve body forming a valve bore of a plurality of passages. A spool valve slides within the valve body. A check valve selectively opens and closes one of the passages. A spring is disposed in the valve bore and biases the spool valve in one direction. The spool valve, check valve, spring, valve bore and passages are configured to control the pressure fluid provided to the torque-transmitting mechanism and a linearly increasing pressure until a first predetermined pressure is achieved and then at a second constant predetermined pressure greater than the first predetermined pressure, thus combining gradual clutch engagement during shifting with valve boost necessary for static capacity requirements. A method of controlling engagement of the torque-transmitting mechanism is also provided.

10 Claims, 2 Drawing Sheets

_US 7,325,885 B2_

REGULATOR VALVE FOR A TORQUE-TRANSMITTING MECHANISM AND METHOD OF ENGAGING A TORQUE-TRANSMITTING MECHANISM

CROSS-REFERENCE TO RELATED APPLICATIONS

This application claims the benefit of U.S. Provisional Application No. 60/586,651, filed Jul. 9, 2004, which is hereby incorporated by reference in its entirety.

TECHNICAL FIELD

The invention relates to an oil flow arrangement for controlling fluid pressure to a torque-transmitting mechanism; specifically, a regulator valve for a torque-transmitting mechanism in a power transmission.

BACKGROUND OF THE INVENTION

Regulator valves responsive to a hydraulic pressure conveyed via an electro-hydraulic control unit are used to control pressure gain of a torque-transmitting mechanism during engagement of the torque-transmitting mechanism. It is desirable to provide a gradual clutch pressure increase during shifting for smooth engagement. Often, a jump or boost in pressure provided at the clutch is required after the period of gradual increase to meet higher static pressure requirements at full engagement.

SUMMARY OF THE INVENTION

A regulator valve having only one spool valve and one check valve provides a gradual clutch pressure increase during the early part of clutch engagement and a pressure boost to meet static requirements. Accordingly, a regulator valve is provided for controlling the pressure of fluid engaging a torque-transmitting mechanism. The valve includes a valve body forming a valve bore and a plurality of passages. A check valve selectively opens and closes one of the passages. The check valve closes the passage when fluid pressure in the passage is not greater than a first predetermined pressure. The check valve opens the passage when fluid pressure in the passage is greater than the first predetermined pressure. A spring is disposed in a valve bore and biases a spool valve in one direction. The spool valve, check valve, spring, valve bore and passages cooperate to control the pressure of fluid provided to the torque-transmitting mechanism so that fluid is provided at a linearly increasing pressure until the first predetermined pressure is achieved at the torque-transmitting mechanism. Fluid is provided at a second, constant predetermined pressure greater than the first predetermined pressure after the first predetermined pressure is provided. Thus, a linearly increasing gradual clutch engagement is achieved with a valve boost to provide necessary static clutch capacity.

In one aspect of the invention, the valve bore has a first diameter in one portion and a second smaller diameter in another portion. The spool valve has a first end land that cooperates with the first diameter to form a first pressure responsive area. The spool valve also has a second end land spaced from the first end land that cooperates with the second diameter to form a second pressure responsive area. Fluid provided via the passages of the valve body acts upon the first and second pressure responsive areas to apply forces which slide the spool valve. Preferably, the passages include a variable pressure passage and a feed passage. Fluid is provided in the variable pressure passage at a linearly increasing rate of pressure causing sliding of the spool valve which permits fluid communication between the feed passage and the torque-transmitting mechanism so that pressure to the torque-transmitting mechanism also increases at a linearly increasing rate.

In yet another aspect of the invention, the passages include a clutch passage between the valve bore and the torque-transmitting mechanism. The passages also include a feedback passage between the valve bore and the check valve. The feedback passage is in fluid communication with the clutch passage. The check valve opens in response to pressure in the feedback passage being greater than the first predetermined pressure. This results from increasing pressure in the clutch passage.

In yet another aspect of the invention, an actuator feed passage is disposed in fluid communication with the check valve. A constant pressure of the first predetermined pressure is maintained in the actuator feed passage. The check valve opens when pressure in the feedback passage is greater than the constant pressure in the actuator feed passage.

In still another aspect of the invention, the passages include a variable pressure passage and an exhaust passage. The spool valve slides when the check valve opens to allow fluid communication between the exhaust passage and the clutch passage, thereby emptying the clutch passage to disengage the torque-transmitting mechanism when the pressure in the variable pressure passage is controlled at zero (0) pounds per square inch (psi). Preferably, force from the spring causes the spool valve to slide when the variable pressure passage is controlled to zero psi.

A method of controlling engagement of the torque-transmitting mechanism includes increasing oil pressure on a first pressure responsive area of a spool valve at a linear rate. Next, the spool valve is slid in one direction in response to force on the spool valve created by the increasing oil pressure. In response to the sliding, an oil feed to the torque-transmitting mechanism is partially opened so that pressure at the torque-transmitting mechanism increases linearly.

In one aspect of the invention, the method includes fluidly communicating the pressure at the torque-transmitting mechanism to a check valve and to a second pressure responsive area of the spool valve which opposes the first pressure responsive area. Next, the check valve is opened when the pressure at the torque-transmitting mechanism surpasses a predetermined amount to allow reduction in pressure at the second pressure responsive area. In response to the check valve opening, the method includes further sliding the spool valve in the one direction. As a result of this further sliding, the oil feed is fully opened to the torque-transmitting mechanism so that pressure at the torque-transmitting mechanism reaches a final static pressure which causes full engagement of the torque-transmitting mechanism.

In yet another aspect of the invention, the method includes biasing the spool valve in an opposing direction, preferably via a spring. The method may further include decreasing oil pressure on the first pressure responsive area and sliding the valve in the opposing direction via the biasing in response to the decreasing oil pressure step. As a result of sliding the valve in the opposing direction, an exhaust passage is opened so that pressure at the torque-transmitting mechanism decreases, causing disengagement of the torque-transmitting mechanism.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
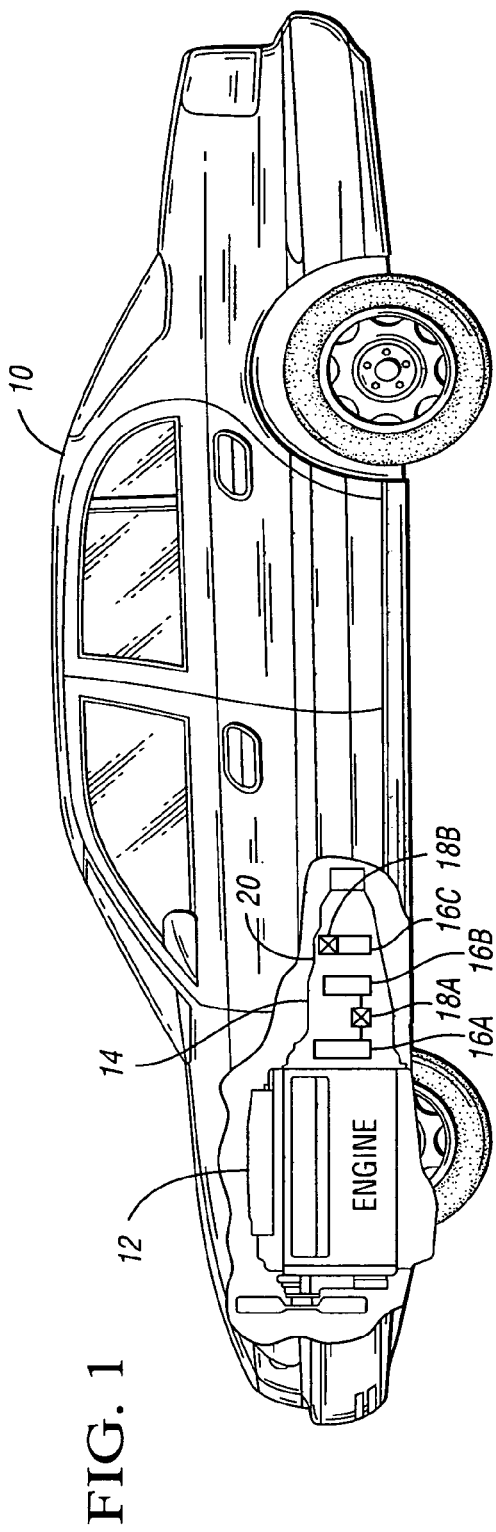
FIG. 1 is a schematic partially fragmentary side view of a vehicle having a transmission.
Figure 2:
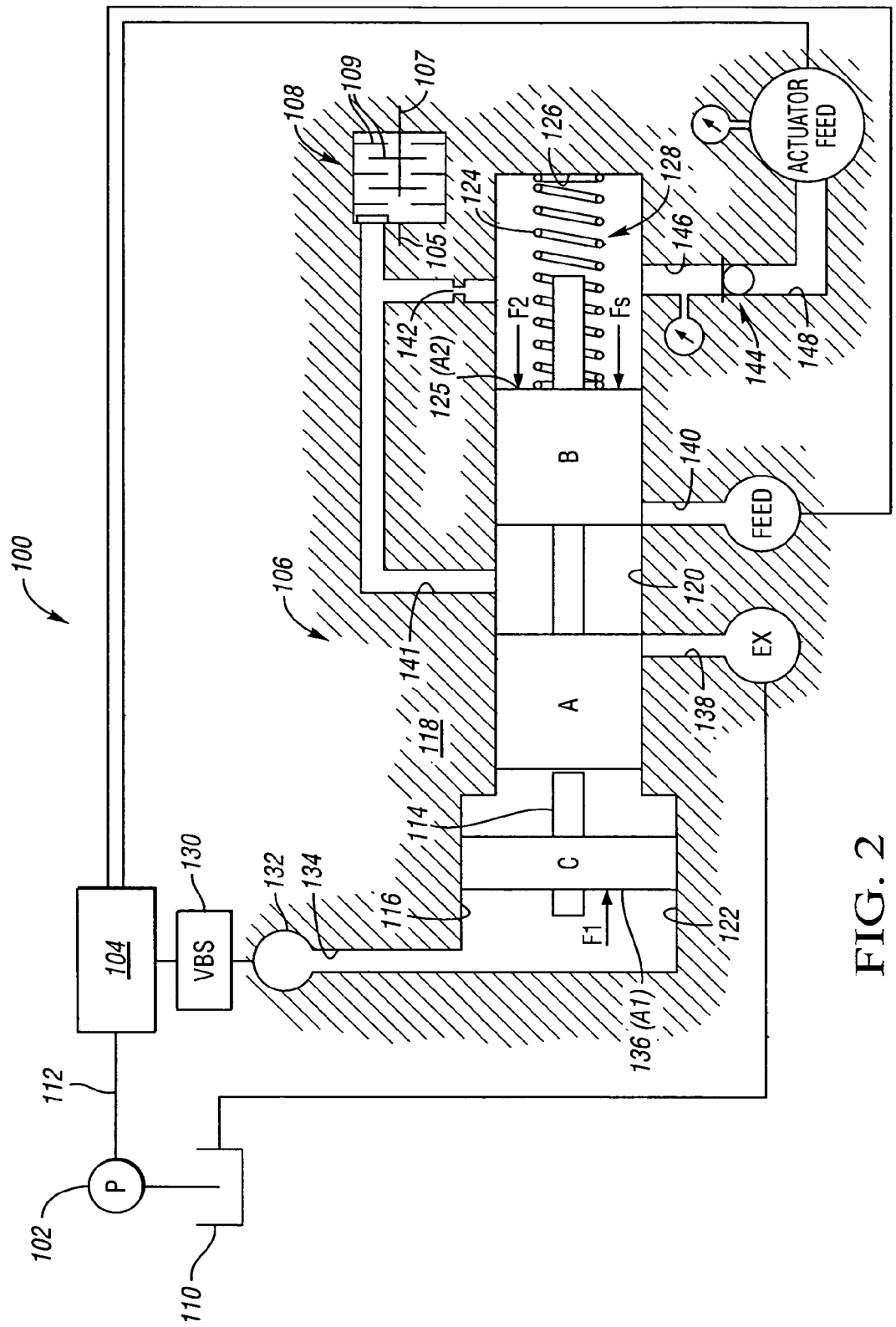
FIG. 2 is a schematic cross-sectional illustration of a regulator valve for controlling a torque-transmitting mechanism in the transmission of FIG. 1.

Referring to the drawings, wherein like reference numbers refer to like components, FIG. 1 shows a vehicle 10 having an engine 12 connected with a transmission 14. The transmission 14 includes three planetary gear sets 16A, 16B and 16C. Torque-transmitting mechanisms interconnect gear elements of the planetary gear sets to one another, such as rotating clutch 18A, or to a stationary transmission housing 20, such as brake 18B. FIG. 2 shows a portion of a transmission control system 100 including a pump 102, an electro-hydraulic control 104, a regulator valve 106 and a torque-transmitting mechanism 108, which, in this embodiment, is a clutch. The pump 102 draws hydraulic fluid (oil) from a reservoir 110 and delivers it to the electro-hydraulic control 104 through a main passage 112.

The electro-hydraulic control 104 includes an electronic control unit (ECU) having a conventional preprogrammed digital computer and also includes conventional control valves that distribute hydraulic fluid to the many devices in the transmission, including the torque-transmitting mechanisms. The ECU emits electrical control signals to various electronic elements such as solenoids that in turn control the output pressure of the hydraulic valves.

The regulator valve 106 has a spool valve 114 slidably disposed in concentric longitudinal arrangement in a stepped valve bore 116 that is formed in a valve body 118. The spool valve 114 has spaced equal diameter lands A and B and a larger diameter end land C. The lands A and B are positioned in a smaller diameter 120 of the bore 116 and the land C is spaced in a larger diameter 122 of the bore 116. A bias spring 124 is compressed between one end 125 of the land B and an end 126 of the bore within a feedback chamber 128 of the bore 116. The spring 124 imposes a force $F_s$ urging (biasing) the spool valve 114 leftward. Additionally, fluid pressure $P_{FDBK}$ within the feedback chamber 128 acts upon a pressure responsive area A2 formed by the bore 120 and the right end 125 of the land B to impose a force $F2=P_{FDBK}*A2$ urging the spool 114 leftward.

The ECU 104 emits a variable signal to a variable bleed solenoid 130 that controls the pressure $P_{VBS}$ of a boost source 132 of hydraulic fluid distributed through a first passage 134 (i.e., a variable pressure port) to a pressure responsive area A1 formed by the bore 116 and the left end 136 of the first land C. The pressure $P_{VBS}$ acts upon the pressure responsive area A1 to impose a force $F1=P_{VBS}*A1$ urging the spool 114 rightward. The valve 106 is in a force balance position when $F1=F2+F_s$. In the neutral position, the first land A blocks an exhaust passage 138 preventing fluid from being exhausted from the clutch 108 to disengage the clutch 108 and the second land B blocks a feed passage 140 (i.e., a feed pressure port) preventing fluid from being fed to the clutch 108 to engage the clutch 108.

As $P_{VBS}$ increases, F1 becomes greater than $F2+F_s$, and the spool valve 114 slides slightly rightward to partially open the feed passage 140 to the clutch 108. Fluid flows through the feed passage 140 to the clutch 108 at feed pressure $P_{FEED}$, enters a clutch passage 141 (also referred to as a clutch pressure port) and begins to increase the clutch pressure $P_C$. The clutch pressure $P_C$ is fed back to the feedback chamber 128 through an orifice 142, thereby increasing feedback pressure $P_{FDBK}$. As $P_{VBS}$ is increased, the clutch pressure $P_C$ and the feedback pressure $P_{FDBK}$ also increase. A ball check valve 144 is disposed between a feedback passage 146 (also referred to as a feedback pressure port) and an actuator feed passage 148 (also referred to as a constant pressure port) in which a constant pressure $P_{ACT}$ of, for example, 130 psi is maintained by the ECU 104. As $P_{VBS}$ increases, $P_{FDBK}$ also increases until it exceeds $P_{ACT}$ at which time the ball check valve 144 opens and limits $P_{FDBK}$ from increasing further beyond $P_{ACT}$ (i.e., 130 psi). Increasing $P_{VBS}$ further forces the spool valve 114 to move further to the right, providing a fully-opened feed passage 140 to feed fluid to the clutch 108 so that the clutch 108 is fully engaged at a clutch pressure $P_C$ equal to a final static pressure $P_{STATIC}$.

When it is desired to disengage the clutch 108, the ECU 104 sets the pressure from the variable bleed solenoid $P_{VBS}$ to 0 psi. The spring force $F_S$ causes the spool valve 114 to move to the left so that first land A no longer blocks the exhaust passage 138 to allow fluid to exhaust from the clutch 108 to disengage the clutch 108.

Figure 3:
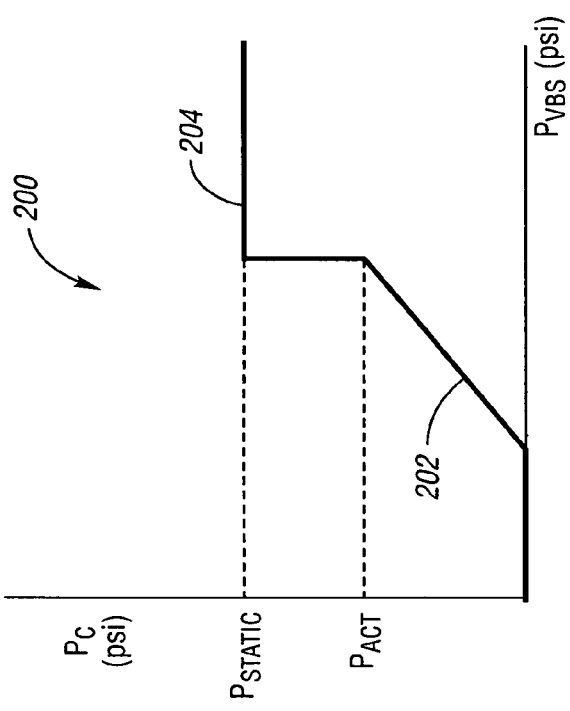
FIG. 3 is a graph of a pressure gain curve of the torque-transmitting mechanism controlled by the regulator valve of FIG. 2.

Referring to FIG. 3, a chart 200 illustrates the relationship of clutch pressure $P_C$ to variable bleed solenoid pressure $P_{VBS}$ and the effect of feedback pressure $P_{FDBK}$. The first portion 202 of the relationship occurs as $P_{VBS}$ is increased so that $F1>F2+F_s$ but $P_{FDBK}$ is not greater than $P_{ACT}$ (i.e., 130 psi). The second portion 204 of the curve occurs when $P_{FDBK}$ is greater than $P_{ACT}$ (i.e., 130 psi) such that the ball check valve 144 opens to exhaust $P_{FDBK}$ pressure in excess of 130 psi and the feed passage 140 is fully opened to create a clutch pressure $P_C$ equal to the constant static pressure $P_{STATIC}$. Thus, a gradual increase in clutch pressure $P_C$ is achieved during the early stage of clutch engagement (i.e., during shifting) to provide a smooth shift feel and a jump (boost) to a higher pressure can be made to meet static capacity requirements. Moreover, this graduated clutch engagement and boost feature is achieved via the use of only one spool valve 114 in one regulator valve 106 and one ball check valve 144. The simplicity of the regulator valve enables the desired clutch pressure increase to be achieved with a minimal number of parts.

While the best mode for carrying out the invention has been described in detail, those familiar with the art to which this invention relates will recognize various alternative designs and embodiments for practicing the invention within the scope of the appended claims.

The invention claimed is:

1. A regulator valve for controlling the pressure of fluid engaging a torque-transmitting mechanism in a transmission, the valve comprising:
    a valve body forming a valve bore and a plurality of passages;
    a spool valve slidably disposed in said valve body;
    a check valve selectively closing one of said passages when fluid pressure in said one of said passages is not greater than a first predetermined pressure and opening when fluid pressure in said one of said passages is greater than said first predetermined pressure;

a spring disposed in said valve bore and biasing said spool valve in one direction; and said spool valve, check valve, spring, valve bore and passages being cooperatively configured to control the pressure of fluid provided at the torque-transmitting mechanism such that the fluid is provided at a linearly increasing pressure until said first predetermined pressure is achieved to the torque-transmitting mechanism and at a second constant predetermined pressure greater than said first predetermined pressure after said first predetermined pressure is provided.

2. The regulator valve of claim 1, wherein said valve bore is characterized by a first diameter and a second diameter smaller than said first diameter;

wherein said spool valve includes a first end land (C) cooperating with said first diameter to form a first pressure responsive area and a second end land (B) spaced from said first end land and cooperating with said second diameter to form a second pressure responsive area; and wherein fluid provided via said passages acts upon said first and second pressure responsive areas to apply forces to said spool valve to slide said spool valve in response to said forces.

3. The regulator valve of claim 2, wherein said passages include a variable pressure passage and a feed passage; wherein fluid is provided in said variable pressure passage at a linearly increasing rate of pressure, causing sliding of said spool valve which permits fluid communication between said feed passage and the torque-transmitting mechanism such that pressure provided to the torque-transmitting mechanism increases at a linearly increasing rate.

4. The regulator valve of claim 1, wherein said passages include a clutch passage between said valve bore and the torque-transmitting mechanism;

wherein said passages further include a feedback passage between said valve bore and said check valve;

said feedback passage being in fluid communication with said clutch passage; and said check valve opening at least partially in response to pressure in said feedback passage greater than said first predetermined pressure.

5. The regulator valve of claim 4, wherein said passages include an actuator feed passage disposed in fluid communication with said check valve and having a constant pressure therein of said first predetermined pressure, said check valve thereby opening when pressure in said feedback passage is greater than said constant pressure in said actuator feed passage.

6. The regulator valve of claim 1, wherein said passages include a clutch passage between said valve bore and the torque-transmitting mechanism, a variable pressure passage and an exhaust passage; wherein said valve body prevents fluid communication between said exhaust passage and said clutch passage when said check valve is closed; and wherein said valve body slides to allow fluid communication between said exhaust passage and said clutch passage to allow fluid to be emptied from said clutch passage to said exhaust passage, thereby disengaging the torque-transmitting mechanism when the pressure in said variable pressure passage is zero (0) psi.

7. The regulator valve of claim 6, wherein force from said spring causes said spool valve to slide when the pressure in the variable pressure passage is zero (0) psi.

8. A regulator valve for controlling the engagement pressure (Pc) of a torque-transmitting mechanism comprising:

an electro-hydraulic control operable to distribute fluid at a variable pressure ($P_{VBS}$), a feed pressure ($P_{FEED}$) and a constant pressure ($P_{ACT}$);

a valve body including a variable pressure port fluidly connected with said variable pressure ($P_{VBS}$), a feed pressure port fluidly connected with said feed pressure ($P_{FEED}$) for feeding fluid to the torque-transmitting mechanism to engage the torque-transmitting mechanism, a clutch pressure port fluidly connected with the torque-transmitting mechanism for conveying said fed fluid to the torque-transmitting mechanism, an exhaust port for exhausting fluid from the torque-transmitting mechanism for disengaging the torque-transmitting mechanism, and a feedback pressure port in fluid communication with said clutch pressure port and with a constant pressure port, said constant pressure port being fluidly connected with said constant pressure ($P_{ACT}$);

a check valve located between said feedback pressure port and said constant pressure port, said check valve configured to maintain a feedback pressure ($P_{FDBK}$) not greater than said constant pressure ($P_{ACT}$) at said feedback pressure port;

a spool valve slidably disposed in a valve bore formed in said valve body, said valve bore cooperating with said spool valve to form a first pressure responsive area (A1) fluidly connected with said variable pressure port and a second pressure responsive area (A2) fluidly connected with said feedback pressure port;

a biasing spring imposing a force ($F_S$) on said spool valve; and wherein engagement pressure ($P_c$) of the torque-transmitting mechanism is defined by $P_c=(P_{VBS}*A1-F_S)/A2$ when $P_C \leq P_{ACT}$, and by $P_C=P_{FEED}$ when $P_C>P_{ACT}$.

9. A method of controlling engagement of a torque-transmitting mechanism comprising:

increasing oil pressure on a first pressure responsive area of a spool valve at a linear rate;

sliding said spool valve in one direction in response to force on said spool valve created by said increasing oil pressure;

in response to said sliding said spool valve in one direction, partially opening an oil feed to the torque-transmitting mechanism such that pressure at the torque-transmitting mechanism increases linearly;

fluidly communicating said pressure at the torque-transmitting mechanism to a check valve and to a second pressure responsive area of said spool valve opposing said first pressure responsive area;

opening said check valve when said pressure at the torque-transmitting mechanism surpasses a predetermined amount to allow reduction in pressure at said second pressure responsive area;

further sliding said spool valve in said one direction in response to said opening said check valve; and in response to said further sliding, fully opening said oil feed to the torque-transmitting mechanism such that pressure at the torque-transmitting mechanism reaches a full static pressure causing full engagement of the torque-transmitting mechanism.

10. The method of claim 9, further comprising:

biasing said spool valve in an opposing direction;

decreasing oil pressure on said first pressure responsive area;

sliding said spool valve in said opposing direction via said biasing in response to said decreasing oil pressure step; and in response to sliding said spool valve in said opposing direction, opening an exhaust passage such that pressure at the torque-transmitting mechanism decreases, causing disengagement of the torque-transmitting mechanism.

* * * * *